(12) United States Patent
Ohmura et al.

(10) Patent No.: US 7,649,551 B2
(45) Date of Patent: Jan. 19, 2010

(54) ELECTRONIC CAMERA SYSTEM, PHOTOGRAPHING ORDERING DEVICE AND PHOTOGRAPHING SYSTEM

(75) Inventors: Akira Ohmura, Tokyo (JP); Shinichi Matsumoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 460 days.

(21) Appl. No.: 11/661,101

(22) PCT Filed: Aug. 29, 2005

(86) PCT No.: PCT/JP2005/015640

§ 371 (c)(1),
(2), (4) Date: Feb. 26, 2007

(87) PCT Pub. No.: WO2006/025311

PCT Pub. Date: Mar. 9, 2006

(65) Prior Publication Data

US 2008/0036871 A1    Feb. 14, 2008

(30) Foreign Application Priority Data

Sep. 1, 2004    (JP)    ............................. 2004-254394

(51) Int. Cl.
*H04N 5/232*    (2006.01)

(52) U.S. Cl. .............................. 348/211.3; 348/211.99; 348/211.1; 348/211.5; 348/14.05; 348/154; 348/155

(58) Field of Classification Search ... 348/14.01–14.16, 348/154, 155, 211.99–211.14
See application file for complete search history.

(56) References Cited

U.S. PATENT DOCUMENTS

| | | | | |
|---|---|---|---|---|
| 5,850,470 A * | 12/1998 | Kung et al. | ................. | 382/157 |
| 6,038,333 A * | 3/2000 | Wang | ......................... | 382/118 |
| 6,188,431 B1 * | 2/2001 | Oie | ......................... | 348/211.5 |
| 7,027,083 B2 * | 4/2006 | Kanade et al. | ............... | 348/159 |
| 7,212,228 B2 * | 5/2007 | Utsumi et | ................... | 348/139 |
| 7,423,666 B2 * | 9/2008 | Sakakibara et al. | ......... | 348/136 |
| 7,479,979 B2 * | 1/2009 | Kakou et al. | ................ | 348/143 |
| 2003/0044046 A1 | 3/2003 | Nakamura et al. | | |
| 2003/0071908 A1 * | 4/2003 | Sannoh et al. | .............. | 348/345 |
| 2008/0117296 A1 * | 5/2008 | Egnal et al. | ................. | 348/143 |

FOREIGN PATENT DOCUMENTS

JP    A 11-095313    4/1999

(Continued)

OTHER PUBLICATIONS

Nikon Coporation, Wireless Transmitter WT-1, Digital Single-Lens Reflex Camera "D2H" Catalog, p. 10 (Sep. 2003). (Translation).

*Primary Examiner*—Sinh Tran
*Assistant Examiner*—Anthony J Daniels
(74) *Attorney, Agent, or Firm*—Oliff & Berridge, PLC

(57) ABSTRACT

An electronic camera system includes a photographing ordering system and a photographing system. The photographing system includes an image sensor which photographs a subject and generates an image signal; a camera-side communication unit which communicates with the photographing ordering system; a subject judging unit which judges whether or not the subject is the person to be photographed based on the person identifying data when or after the subject is photographed; an image processing unit which generates the image data with the image signal; and a camera-side control unit which extracts the image data of which the person to be photographed has been photographed based on a judged result of the subject judging unit and transmits the extracted image data to the photographing ordering system.

1 Claim, 13 Drawing Sheets

FOREIGN PATENT DOCUMENTS

| | | |
|---|---|---|
| JP | A 2003-069884 | 3/2003 |
| JP | A 2003-179912 | 6/2003 |
| JP | A 2003-244685 | 8/2003 |
| JP | A 2003-284050 | 10/2003 |
| JP | A 2003-324649 | 11/2003 |

* cited by examiner

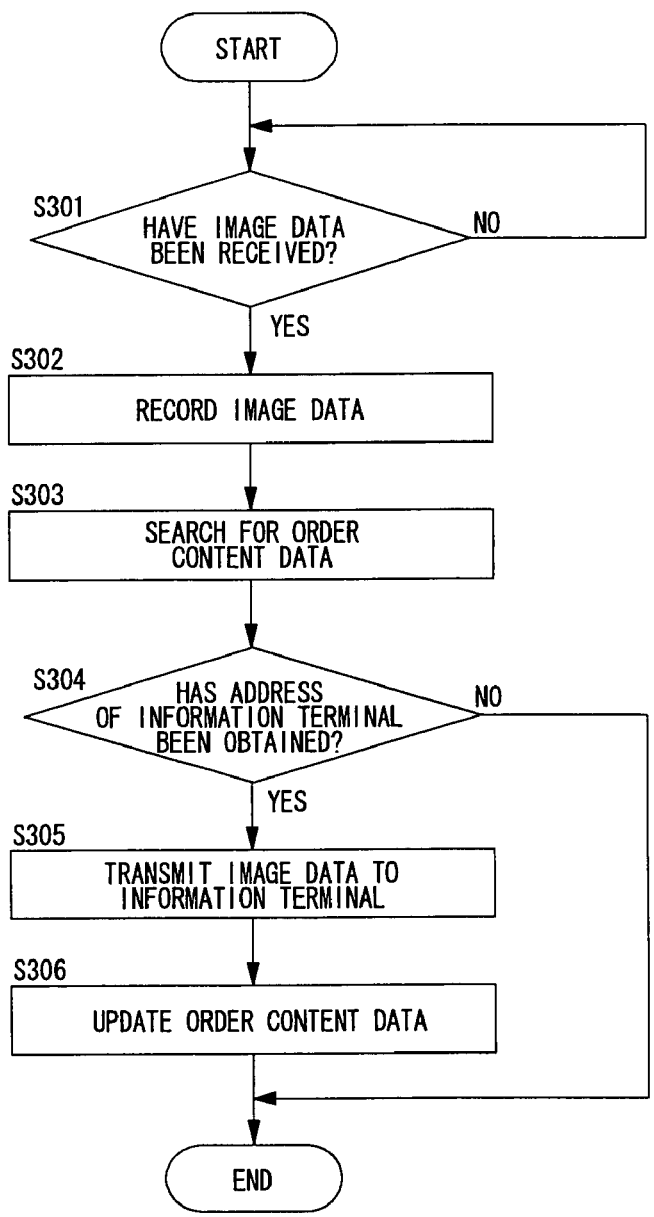
F I G. 7

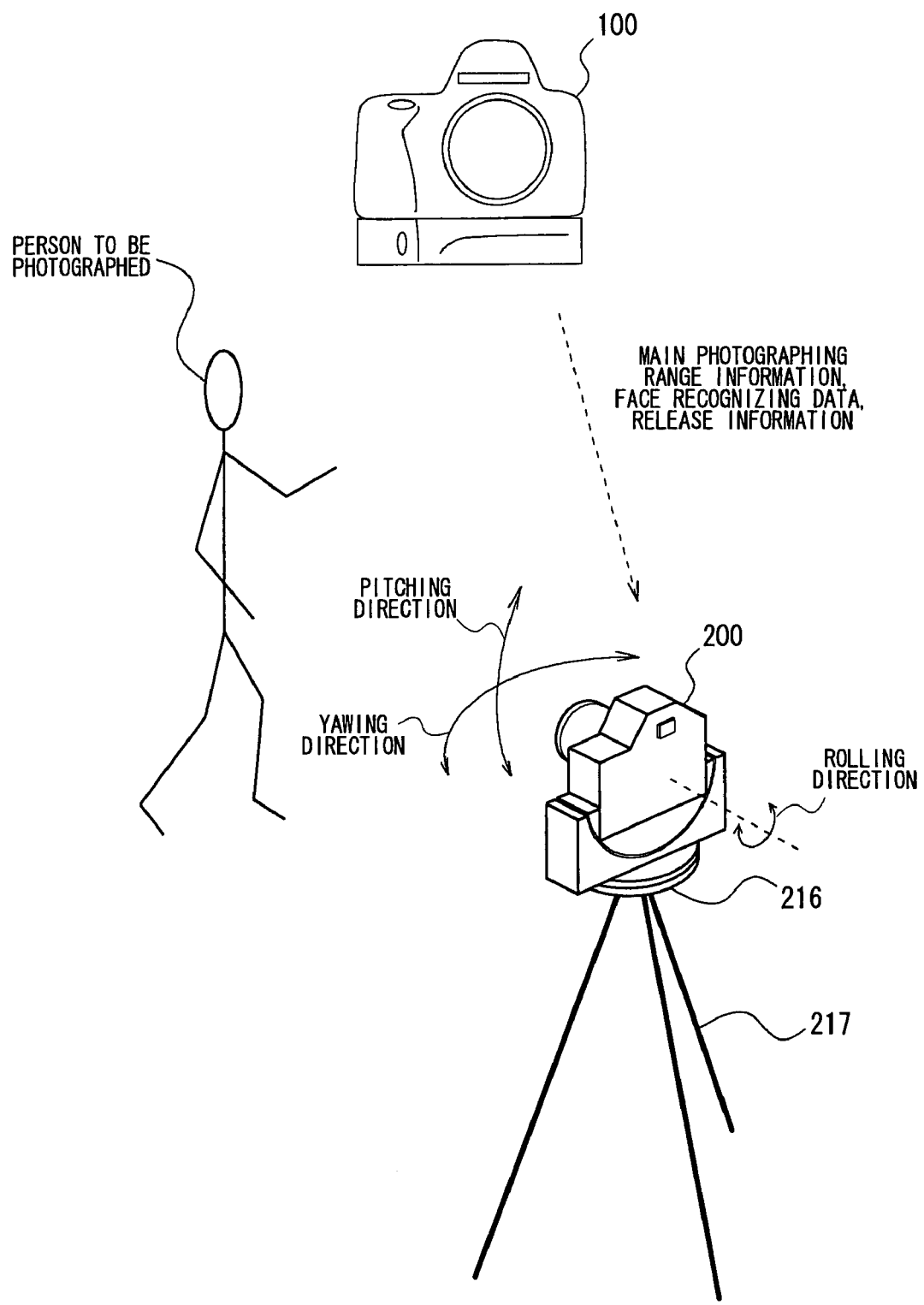
F I G. 10

ELECTRONIC CAMERA SYSTEM, PHOTOGRAPHING ORDERING DEVICE AND PHOTOGRAPHING SYSTEM

CROSS-REFERENCE TO RELATED APPLICATION

This application is a U.S. National Stage application claiming the benefit of prior filed International Application Number PCT/JP2005/015640, filed Aug. 29, 2005, in which the International Application claims a priority date of Sep. 1, 2004 based on prior filed Japanese Application Number 2004-254394, the entire contents of which are incorporated herein by reference.

TECHNICAL FIELD

The present invention relates to an electronic camera system using an electronic camera that transmits and receives data to and from for example another communication device.

BACKGROUND ART

In recent years, electronic cameras that convert a subject image into electricity and generate image data are rapidly being widespread. For such an electronic camera, an extension unit of a wireless communication device that transmits photographed image data to the outside is known (refer to non-patent document 1). Thus, for example, in the news field, it is becoming very common that image data photographed at site are transmitted to an editorial department through a communication line network and image data at site are obtained without a time lag.

In addition, in the news field, when photography is performed at a remote location, it may be difficult to properly employ photographers. Thus, when a subject needs to be photographed from many directions, it would be convenient if one photographer could operate a plurality of electronic cameras. With respect to this point, patent document 1 discloses a remote control tripod head system for video camera photography.

However, if a photographer at site cannot identify a person to be photographed, image data of the desired person cannot be obtained. If the number of frames to be photographed is large, the photographer or the editor needs to spend much time to select image data of the desired person. If the photographer at site has photographing orders from many editors, he or she may mistakenly transmit image data to them or forget to photograph desired people. The foregoing non-patent document 1 does not disclose any countermeasures against such problems.

The technique disclosed in the foregoing non-patent document allows one photographer to operate a plurality of cameras to photograph a subject from many directions. However, a slave camera that the photographer does not directly operate may not correctly frame a subject. Thus, there is yet room for improvement in the related art.

Patent document 1: Japanese Unexamined Patent Application Publication No. HEI 11-95313
Non-patent document: Digital single-lens reflex camera "D2H" catalog—Wireless Transmitter WT-1, NIKON CORPORATION, Sep. 15, 2003, p. 10

DISCLOSURE OF THE INVENTION

Problems to be Solved by the Invention

The present invention is made to solve at least one of the problems in the foregoing related art. An object of the present invention is to provide an electronic camera system that allows an editor at a remote location to more securely obtain image data of a person to be photographed than the related art.

Another object of the present invention is to provide an electronic camera system that allows one photographer to operate a plurality of cameras such that a slave camera that he or she does not directly operate to correctly frame a subject with high possibility.

Means for Solving the Problems

A first aspect of the present invention is an electronic camera system includes a photographing ordering system and a photographing system. The photographing ordering system includes a recording unit and a communication control unit. The recording unit records person identifying data used to identify a person to be photographed whom an orderer desires. The communication control unit transmits the person identifying data to the photographing system and receives image data of which the person to be photographed has been photographed from the photographing system. The photographing system includes an image sensor, a camera-side communication unit, a subject judging unit, an image processing unit, and a camera-side control unit. The image sensor photographs a subject and generates an image signal. The camera-side communication unit communicates with the photographing ordering system. The subject judging unit judges whether or not the subject is the person to be photographed based on the person identifying data when or after the subject is photographed. The image processing unit generates the image data with the image signal. The camera-side control unit extracts the image data of which the person to be photographed has been photographed based on a judged result of the subject judging unit and transmits the extracted image data to the photographing ordering system.

A second aspect of the present invention is the electronic camera system of the first aspect wherein the photographing ordering system further includes an information terminal and a photographing ordering device. The information terminal includes an input unit which identifies the person to be photographed and inputs an order of the image data. The photographing ordering device includes a terminal connection unit which is capable of connecting a plurality of the information terminals, the recording unit, and the communication control unit. The communication control unit transmits the person identifying data to the photographing system when the order is input, records relationship of order content data which represent the person to be photographed ordered by the information terminal and unique address information of each of the information terminals to the recording unit, searches for the address information of the information terminal which has ordered the image data based on the order content data when the image data are received, and transmits the image data to the information terminal corresponding to the address information.

A third aspect of the present invention is an electronic camera system including a photographing ordering system and a photographing system. The photographing ordering system includes a record unit and a device-side communication unit. The record unit records person identifying data used to identify a person to be photographed whom an orderer desires. The device-side communication unit transmits the person identifying data to the electronic camera. The photographing system includes an image sensor, a camera-side communication unit, a subject judging unit, and an alarm unit. The image sensor photographs a subject and generates an image signal. The camera-side communication unit communicates with the photographing ordering device. The subject judging unit judges whether or not the subject on a photographing screen is the person to be photographed based on the person identifying data. The alarm unit informs a photographer that the person to be photographed is on the photographing screen based on a judged result of the subject judging unit.

A fourth aspect of the present invention is a photographing ordering device having a communication function. The photographing ordering device and an electronic camera compose an electronic camera system. The electronic camera is capable of judging whether or not a subject is a person to be photographed based on person identifying data used to recognize a face of the subject. The photographing ordering device includes a terminal connection unit, a recording unit, and a communication control unit. The terminal connection unit is capable of connecting a plurality of information terminals each of which identifies the person to be photographed and inputs an order of the image data. The recording unit records relationship of the person identifying data used to identify the person to be photographed whom an orderer desires, order content data which represent the person to be photographed whom the information terminal has ordered, and unique address information assigned to each of the information terminals. The communication control unit transmits the person identifying data to the electronic camera when the order is input, records the relationship of the order content data which represent the person to be photographed ordered by the information terminal and the unique address information of each of the information terminals to the recording unit, searches for the address information of the information terminal which has ordered the image data based on the order content data when the image data are received, and transmits the image data to the information terminal corresponding to the address information.

A fifth aspect of the present invention is a photographing system having a communication function. The photographing system and a photographing ordering device compose an electronic camera system. The photographing ordering device stores person identifying data used to recognize a face of a subject. The photographing system includes an image sensor, a camera-side communication unit, a subject judging unit, an image processing unit, and a camera-side control unit. The image sensor photographs the subject and generates an image signal. The camera-side communication unit communicates with the photographing ordering device. The subject judging unit judges whether or not the subject is the person to be photographed based on the person identifying data when or after the subject is photographed. The image processing unit generates the image data with the image signal. The camera-side control unit extracts the image data of which the person to be photographed has been photographed based on a judged result of the subject judging unit and transmits the extracted image data to the photographing ordering device.

A sixth aspect of the present invention is a photographing system having a communication function. The photographing system and a photographing ordering device compose an electronic camera system. The photographing ordering device stores person identifying data used to recognize a face of a subject. The photographing system includes an image sensor, a camera-side communication unit, a subject judging unit, and an alarm unit. The image sensor photographs the subject and generates an image signal. The camera-side communication unit communicates with the photographing ordering device. The subject judging unit judges whether or not the subject on a photographing screen is the person to be photographed based on the person identifying data. The alarm unit informs a photographer that the person to be photographed is on the photographing screen based on a judged result of the subject judging unit.

A seventh aspect of the present invention is an electronic camera system including a master electronic camera and a slave electronic camera. The master electronic camera includes a first photographing mechanism, an operation member which executes a release of the photographing mechanism, a first photographing range information generation unit, a recording unit, and a recording unit. The first photographing mechanism photographs a subject. The first photographing range information generation unit generates main photographing range information which represents a position of a person to be photographed of the first photographing mechanism based on position information, a photographing distance, a photographing angle of view, and a photographing direction of the master electronic camera. The recording unit stores person identifying data used to recognize a face of the person to be photographed. The first communication unit transmits the main photographing range information, the person identifying data, and release information to the slave electronic camera. The slave electronic camera includes a second photographing mechanism which photographs the subject, a second photographing range information generation unit, a drive mechanism, a drive mechanism, a subject judging unit, an arithmetic operation unit, an arithmetic operation unit, and a control unit. The second photographing range information generation unit generates sub photographing range information based on the position information, the photographing distance, the photographing angle of view, and the photographing direction of the slave electronic camera. The drive mechanism rotates the second photographing mechanism and varies the photographing direction thereof. The second communication unit receives information from the first communication unit. The subject judging unit judges whether or not the person to be photographed is at any position on a photographing screen of the second photographing mechanism based on the person identifying data. The arithmetic operation unit performs an arithmetic operation for control information with which the person to be photographed is photographed based on the main photographing range information and the sub photographing range information. The compensation arithmetic operation unit compensates the control information and frames the person to be photographed in a designation range when the person to be photographed is on the photographing screen and the person to be photographed does not match the designation range on the photographing range. The control unit controls the second photographing mechanism and the drive mechanism based on the control information and causes the second photographing mechanism to perform photography based on the release information.

According to the present invention, when or after photography is performed, the electronic camera judges whether or not a subject is a person to be photographed based on person identifying data transmitted from the photographing ordering system and transmits image data of the person to be photographed that have been extracted based on the judged result to the photographing ordering system. Thus, since the electronic camera judges a person to be photographed, an editor at a remote location can more securely obtain image data of the person to be photographed than the related art.

In addition, according to the present invention, the possibility of which a slave electronic camera that a photographer remotely operates photographs a person to be photographed at photographer's intention more improves than the related art.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 7 is a flow chart showing an operation of the photographing ordering device according to the first embodiment upon receiving image data;

FIG. 10 is a schematic diagram showing an electronic camera system according to a fourth embodiment;

BEST MODE FOR CARRYING OUT THE INVENTION

Next, with reference to the accompanying drawings, embodiments of the present invention will be described in detail.

Description of First Embodiment

Figure 1:
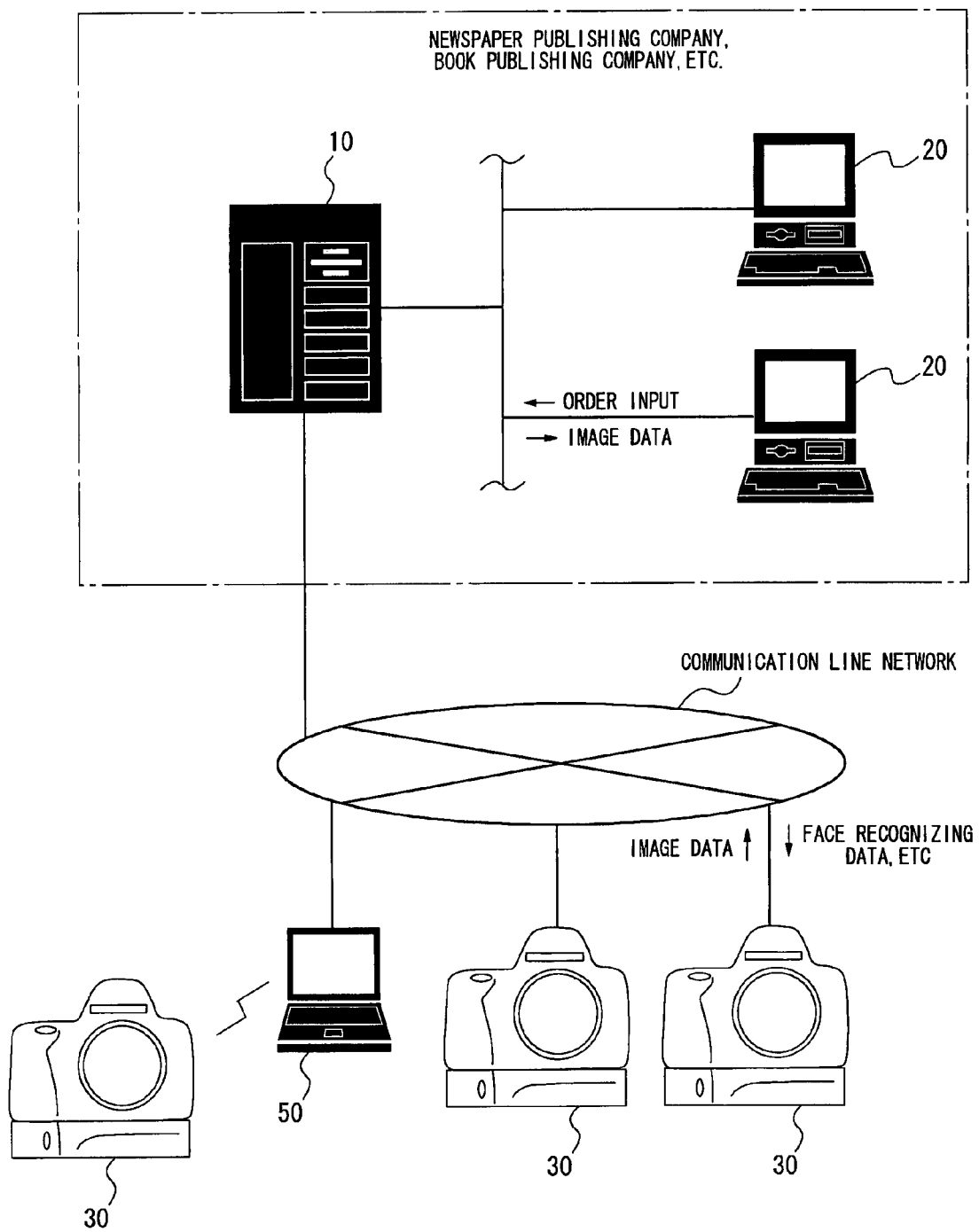
FIG. 1 is a schematic diagram showing an electronic camera system according to a first embodiment.

FIG. 1 is a schematic diagram showing an electronic camera system according to a first embodiment of the present invention. The electronic camera system of the first embodiment is operated in a newspaper publishing company, a book publishing company, and so forth that often order photographers to perform photography. The electronic camera system is composed of a photographing ordering device 10, an information terminal 20 that an editor (orderer) uses, and an electronic camera 30 that a photographer has.

(Structures of Photographing Ordering Device and Information Terminal)

Figure 2:
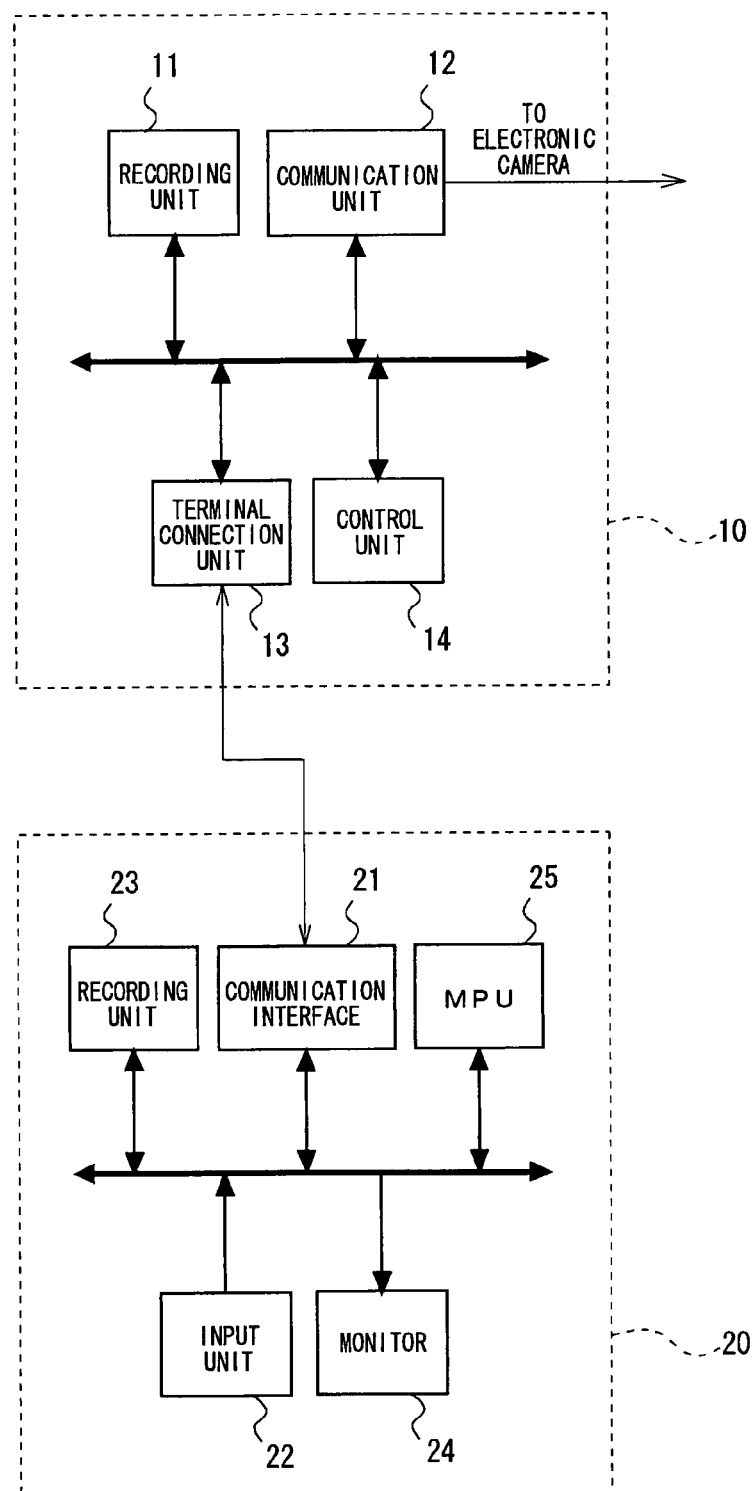
FIG. 2 is a block diagram showing a photographing ordering device and an information terminal.

The photographing ordering device 10 has a recording unit 11, a communication unit 12, a terminal connection unit 13, and a control unit 14 (refer to FIG. 2).

The recording unit 11 records relationship of face recognizing data (for example, data of relationship of positions of face parts such as eyebrows, eyes, nose, and mouth) and search item data (for example, name, place of birth, sex, age, outlined personal history, membership, and sports name (if athlete) of each person to be photographed. The recording unit 11 has a storage area that records relationship of order content data that represent each person to be photographed that each information terminal 20 has ordered and an IP address assigned to each information terminal 20. In addition, the recording unit 11 records schedule information of each photographer along with an IP address assigned to the electronic camera 30 that each photographer has.

The communication unit 12 controls data transmission and reception to and from each electronic camera 30 connected through a known communication line. In particular, the communication unit 12 of the first embodiment transmits face recognizing data and so forth to each electronic camera 30. The communication unit 12 receives image data and so forth from each electronic camera 30. In addition, the terminal connection unit 13 is structured in such a manner that a plurality of information terminals 30 can be connected. The terminal connection unit 13 controls data transmission and reception to and from each information terminal 20.

The control unit 14 controls an arithmetic operation of each unit of the photographing ordering device 10. For example, the control unit 14 searches for face recognizing data based on search item data, transmits face recognizing data to each electronic camera, records order content data and IP address, and transfers received image data to each information terminal.

Each information terminal 20 is for example a personal computer. Each information terminal 20 is connected to the photographing ordering device 10 such that a LAN system is structured. The information terminal 20 has a communication interface 21, an input unit 22, a recording unit 23, a monitor 24 that displays a search screen, an order input screen, and so forth, and an MPU 25 that controls an arithmetic operation of each unit of the terminal (refer to FIG. 2).

The communication interface 21 controls data transmission and reception to and from the photographing ordering device 10. The input unit 22 is composed of a keyboard, a pointing device, and so forth. The input unit 22 is used for an orderer to input search item data, an order for image data, and an additional condition such as deadline. The recording unit 23 records image data of each person to be photographed generated by the electronic camera 30.

(Structure of Electronic Camera)

Figure 3:
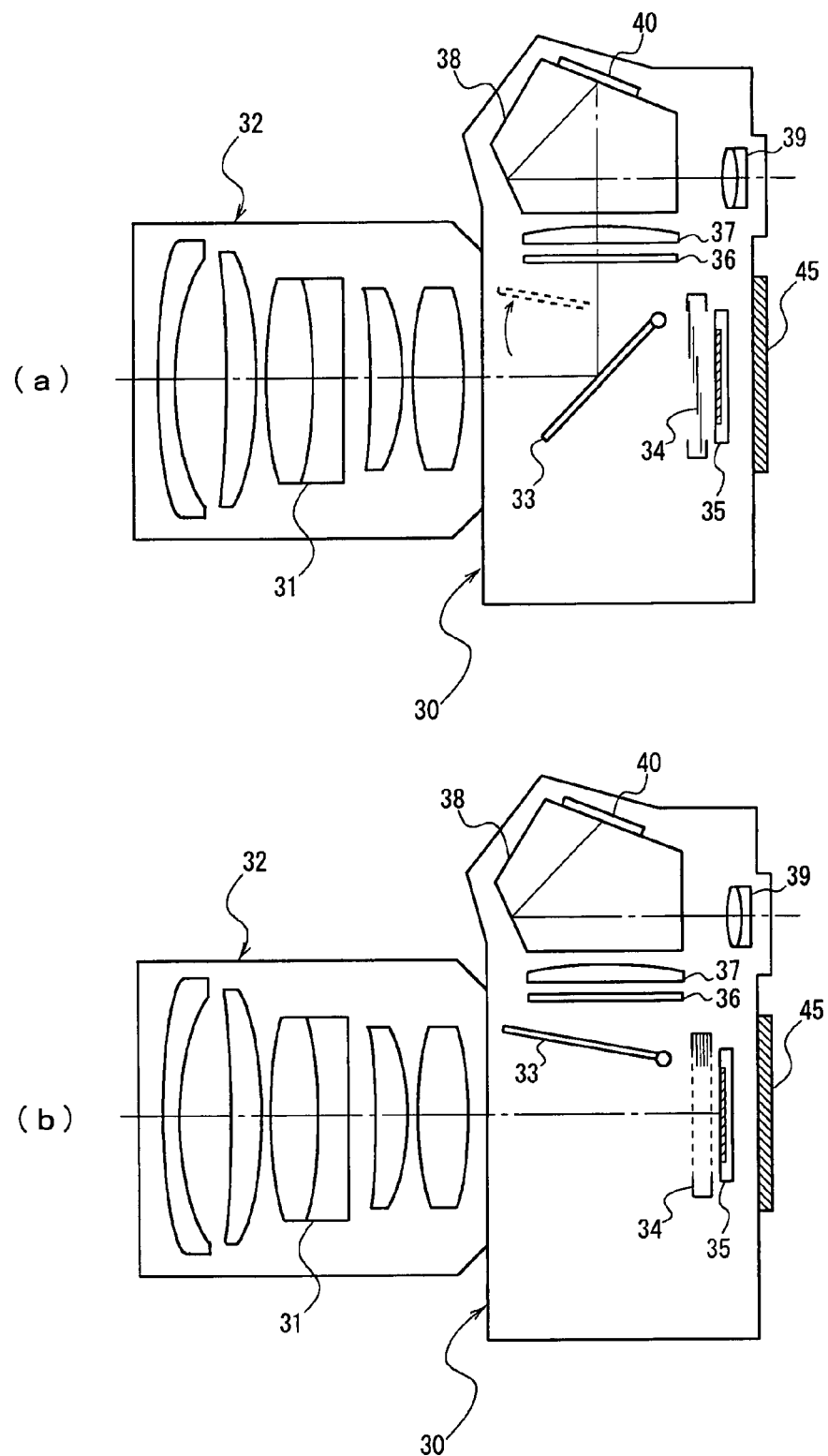
FIG. 3 is a schematic diagram showing a photographing mechanism of an electronic camera.
Figure 4:
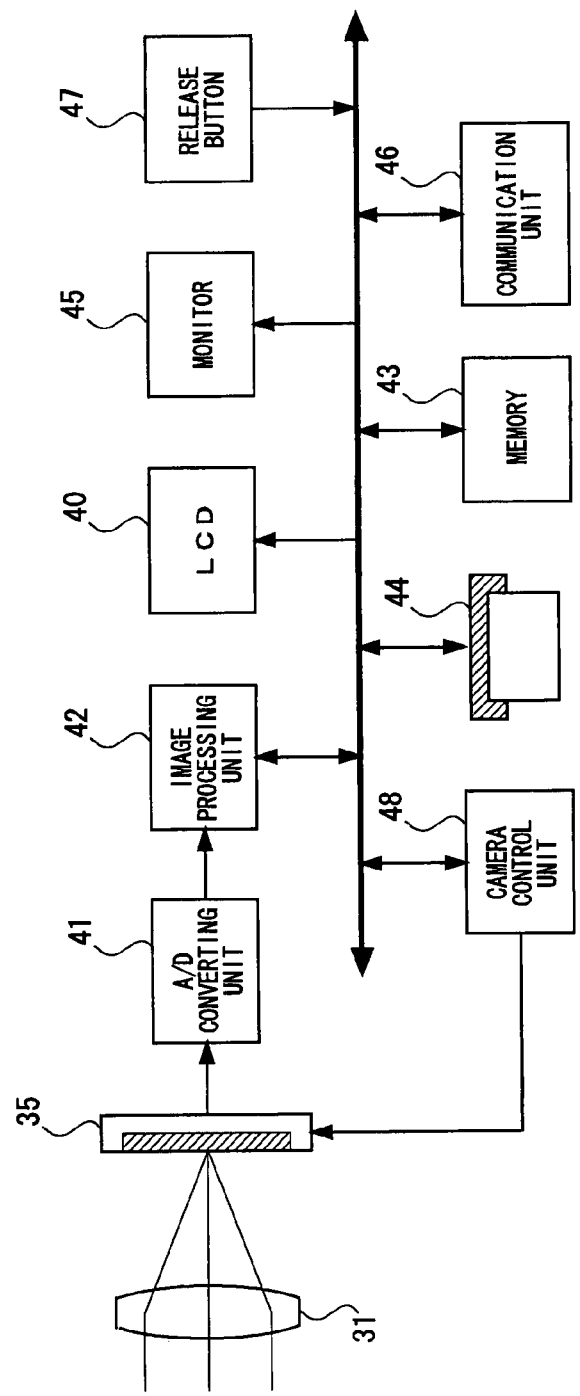
FIG. 4 is a block diagram showing the electronic camera.

FIG. 3 is a schematic diagram showing an outline of a photographing mechanism of each electronic camera 30. FIG. 4 is a block diagram showing each electronic camera 30. The electronic camera 30 of the first embodiment is a single-lens reflex type and has a person recognizing photographing mode in which the electronic camera 30 judges a person to be photographed before photographing it based on face recognizing data in addition to a regular photographing mode.

First of all, the photographing mechanism of the electronic camera 30 will be described. Disposed on the front surface of the electronic camera 30 is a lens unit 32 having a built-in photographing lens 31 such that the lens unit 32 is interchangeable by bayonet mount or the like. Disposed at a center portion of the electronic camera 30 are a quick return mirror 33, a focal plane shutter 34, and an image sensor 35 along an optical axis of the photographing lens 31. Disposed in an upper area of the electronic camera 30 is an optical finder system that is composed of a diffusion screen 36, a condenser lens 37, a pentaprism 38, and an ocular lens 39. Disposed near the pentaprism 38 is an LCD 40. The LCD 40 displays a finder moving picture in the person recognizing photographing mode.

The quick return mirror 33 is inclined in front of the focal plane shutter 34 and the image sensor 35 when the photographer observes a scene in the regular photographing mode (in non-photographing state). When the quick return mirror 33 is inclined, the quick return mirror 33 upwardly reflects a light beam that has passed through the photographing lens 31 and guides the light beam to the finder optical system. The light beam reflected by the quick return mirror 33 is focused on the diffusion screen 36 and then the light beam reaches the eye of the photographer through the condenser lens 37, the pentaprism 38, and the ocular lens 39 (refer to FIG. 3(a)).

In contrast, in the state that photography is performed in the regular photographing mode or in the person recognizing photographing mode, the quick return mirror 33 is leaped up. When the quick return mirror 33 is leaped up, the light beam that has passed through the photographing lens 31 is guided to the focal plane shutter 34 and the image sensor 35. In the person recognizing photographing mode, the focal plane shutter 34 is open. The LCD 40 displays a finder moving picture as a subject image captured at intervals of a constant time period by the image sensor 35. The light beam of the finder moving picture reaches the eye of the photographer through the pentaprism 38 and the ocular lens 39. Thus, in the person recognizing photographing mode, when the photographer looks in the ocular lens 39 in the same manner as the regular photographing mode, he or she can frame the finder moving picture (refer to FIG. 3(b)).

Next, a circuit structure of the electronic camera will be described. The electronic camera 30 has the image sensor 35, an A/D converting unit 41, an image processing unit 42, a memory 43, a record medium 44, a monitor 45, the LCD 40, a communication unit 46, a release button 47, and a camera control unit 48.

The image sensor 35 converts light of a subject that has passed through the photographing lens 31 into electricity and outputs it as an analog image signal. In the person recognizing photographing mode, the image sensor 35 reads the analog image signal at intervals of a predetermined time period and outputs the resultant image signal.

The A/D converting unit 41 converts the analog image signal into a digital image signal and outputs it to the image processing unit 42. The image processing unit 42 performs an image process including for example gamma compensation, interpolation, white balance adjustment, and so forth for the input digital image signal and thereby generates image data. In addition, the image processing unit 42 performs compression and decompression processes for image data and generates a finder moving picture in the person recognizing photographing mode. In the person recognizing photographing mode, the image processing unit 42 identifies a subject of a finder moving picture based on face recognizing data transmitted from the photographing ordering device 10 and judges whether the subject is a person to be photographed.

In the image process, image data are temporarily stored in the memory 43. The memory 43 has a record area for face recognizing data and so forth transmitted from the photographing ordering device 10. The record medium 44 is detachably attached to the electronic camera 30. Image data for which the image process has been preformed are stored in the record medium 44.

Disposed on the rear surface of the electronic camera 30 is the monitor 45. The monitor 45 displays a reproduction screen for image data, a menu screen, and so forth. As described above, the LCD 40 displays a finder moving picture. The communication unit 46 controls data transmission and reception to and from the photographing ordering device 10 connected through a known communication line. For example, the camera control unit 48 switches between photographing modes of the electronic camera 30 and executes various types of arithmetic operation processes such as AE arithmetic operation and AF arithmetic operation and controls an operation of each unit of the electronic camera 30. When a tag of image data is generated, the camera control unit 48 adds marker information to the tag. With the marker information, after a person to be photographed is photographed, the camera control unit 48 can identify image data of which the person to be photographed has been photographed.

Description of Operation of First Embodiment

The electronic camera system of the first embodiment is structured as described above. Next, the operation of the electronic camera system will be described step by step.

Figure 5:
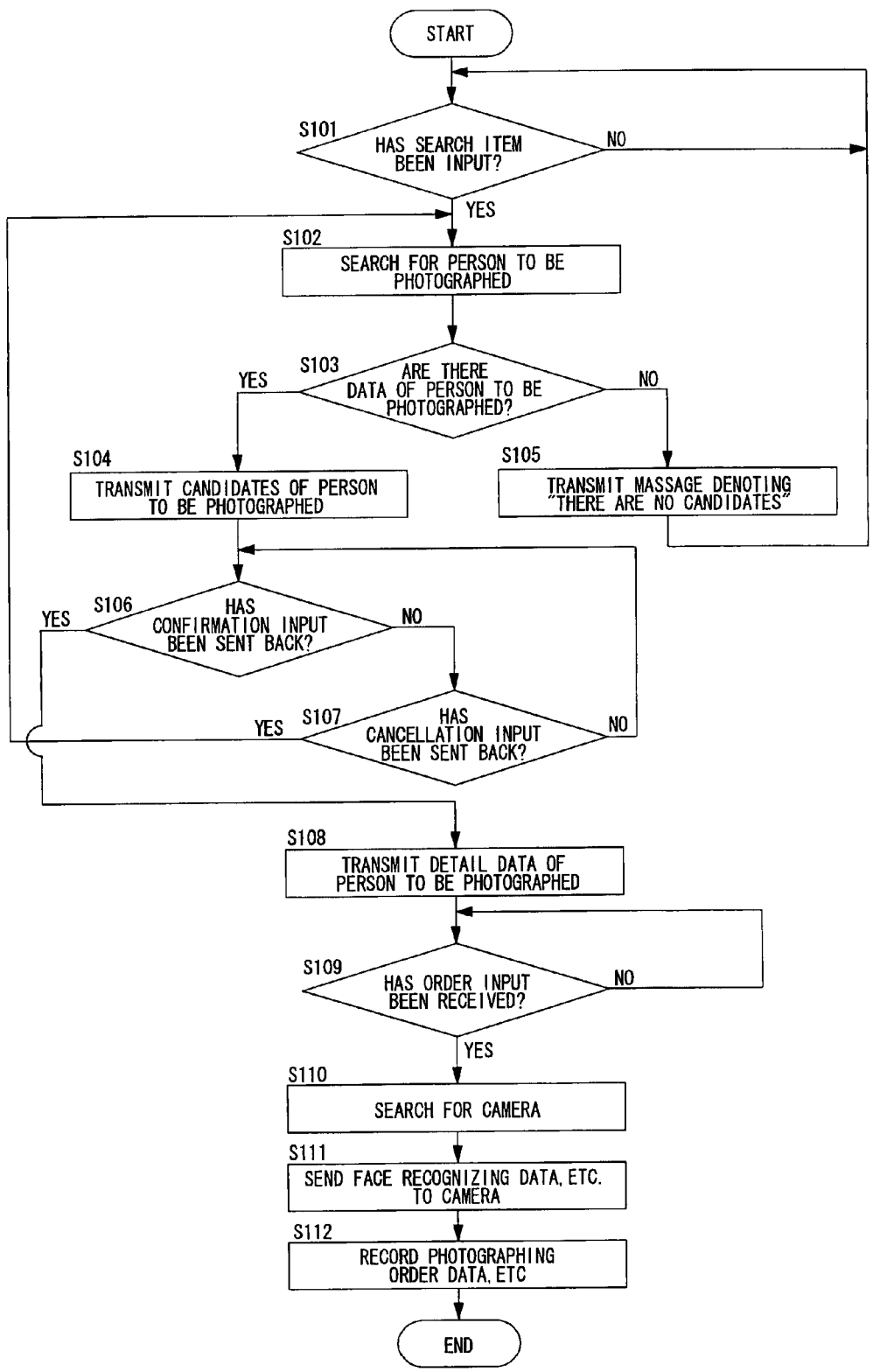
FIG. 5 is a flow chart showing an operation of the photographing ordering device according to the first embodiment upon ordering photography.

FIG. 5 is a flow chart showing the operation of the photographing ordering device 10 according to the first embodiment upon ordering photography.

The photographing ordering device 10 is in standby state until an input operation is performed on the information terminal 20 (S101). When an editor inputs a search item for a person to be photographed on the information terminal 20, the control unit 14 of the photographing ordering device 10 collates the input search item with search item data stored in the recording unit 11 and searches for the person to be photographed (S102). The control unit 14 judges whether or not there are data of the person to be photographed corresponding to the input search item (S103). When there are data (YES side), the control unit 14 transmits the search result data of candidates of the person to be photographed to the information terminal 20 (S104). As a result, the monitor 24 of the information terminal 20 displays a screen of a list of the candidates of the person to be photographed. The screen of the list may display face photos along with the names of the candidates of the person to be photographed. In contrast, when there are no data (NO side), the control unit 14 transmits a message that denotes that the recording unit 11 does not have data of the person to be photographed to the information terminal 20 (S105). Thereafter, the flow returns to step S101.

Thereafter, the control unit 14 judges whether or not a confirmation input that confirms the person to be photographed from the candidates thereof has been sent back from the information terminal 20 (S106). When the confirmation input has been sent back (YES side), the flow advances to step S108. In contrast, when the confirmation input has not been sent back (NO side), the control unit 14 judges whether or not a cancellation input that denotes that the search result is cancelled has been sent back from the information terminal 20 (S107). When the cancellation input has been sent back (YES side), the control unit 14 cancels the search result and the flow returns to step S102. In this case, the editor changes a search item and searches for a person to be photographed once again. In contrast, when the cancellation input has not been sent back (NO side), the flow returns to step S106. At step S106, the control unit 14 is in standby state until the confirmation input or the cancellation input is sent back from the information terminal 20.

When the control unit 14 has received the confirmation input, the control unit 14 transmits detail data of the person to be photographed for example profile, face photo, schedule, and address to the information terminal 20 (S108). As a result, the monitor 24 of the information terminal 20 displays a detail information screen including the foregoing data. With reference to the screen of the detail information, the editor inputs an order with the person to be photographed, the location of the photography, the deadline, the image size, and so forth, the name of the designated photographer, and so forth to the information terminal 20.

After the control unit 14 transmits detail data to the information terminal 20, the control unit 14 is in standby state until an order is input on the information terminal 20 (S109). When an order is input on the information terminal 20, the control unit 14 searches for schedule information of photographers from the recording unit 11 and extracts a photographer who is staying near the desired photographing location and who can work until the deadline (S110). When the editor has designated a photographer, this step is omitted.

Thereafter, the control unit 14 transmits the face recognizing data of the person to be photographed and data of deadline information and so forth to the electronic camera 30 of the extracted photographer (or designated photographer) (S111). Thereafter, the control unit 14 generates order content data that contain the IP address of the electronic camera 30 to which the face recognizing data have been transmitted, order contents such as the person to be photographed, and data of the current state (for example, "ordering", "image data already obtained", and so forth) and correlatively stores the order content data and the IP address of the information terminal 20 to the recording unit 11 (S112). Thereafter, the operation of the photographing ordering device 10 upon ordering photography is completed.

Figure 6:
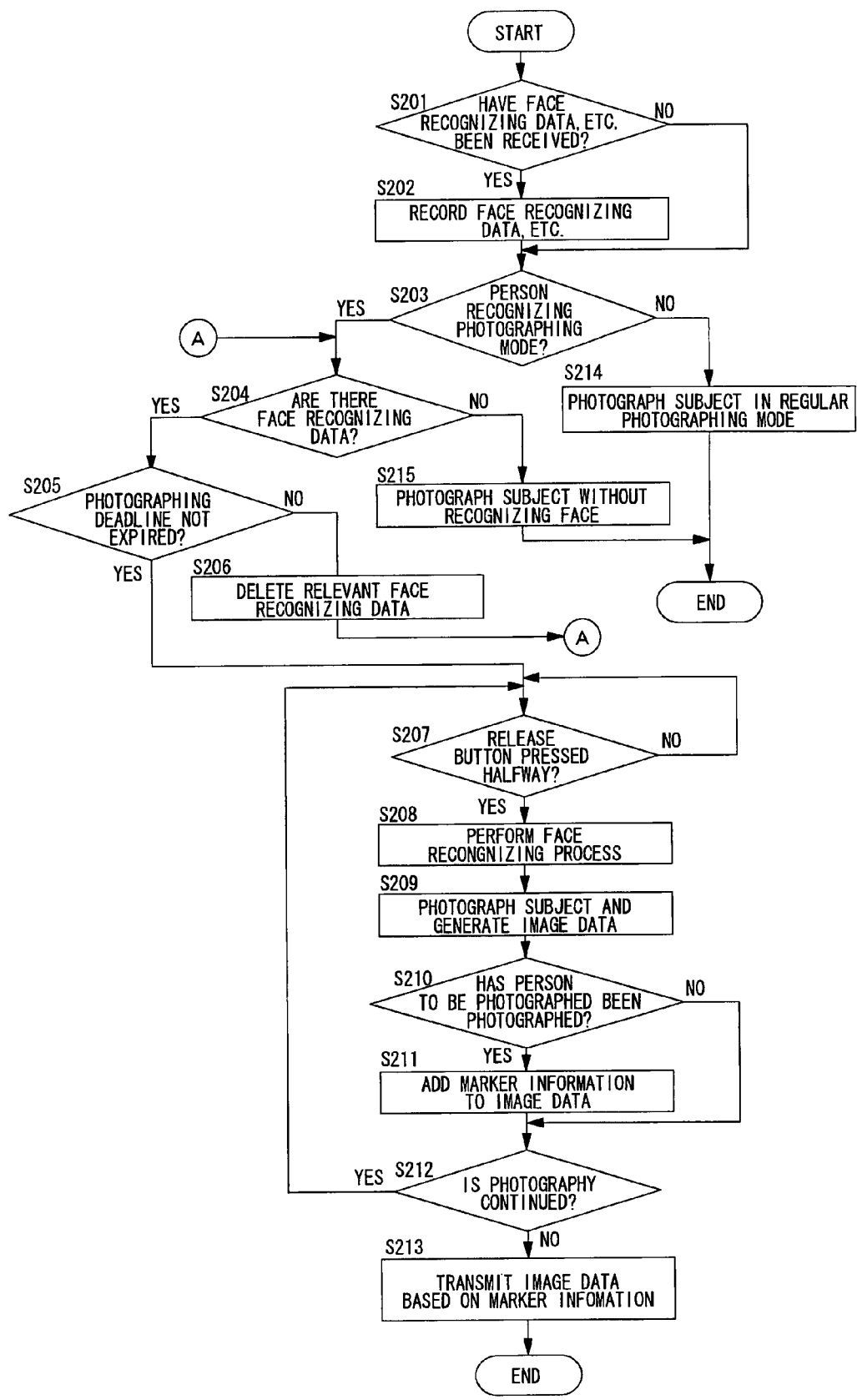
FIG. 6 is a flow chart showing an operation of the electronic camera according to the first embodiment.

FIG. 6 is a flow chart showing an operation of the electronic camera 30 according to the first embodiment.

The camera control unit 48 of the electronic camera 30 judges whether or not face recognizing data and so forth have been received from the photographing ordering device 10 (S201). When the data have been received (YES side), the camera control unit 48 records these data to the memory (S202). In contrast, when the data have not been received (NO side), the flow advances to step S203.

Thereafter, the camera control unit 48 judges whether or not the photographing mode has been set for the person recognizing photographing mode (S203). When the photographing mode has been set for the person recognizing photographing mode (YES side), the flow advances to step S204. In contrast, when the photographing mode has been set for the regular photographing mode (NO side), the camera control unit 48 photographs a subject in the regular photographing mode (S214).

Thereafter, the camera control unit 48 judges whether or not face recognizing data have been recorded in the memory 43 (S204). When the face recognizing data have been recoded (YES side), the flow advances to step S205. In contrast, when the face recognizing data have not been recoded (NO side), the camera control unit 48 photographs the subject without recognizing the face (S215).

In addition, the camera control unit 48 collates the deadline information of the face recognizing data recorded in the memory 43 with the current date and time and judges whether or not the photographing deadline has expired (S205). When the photographing deadline has not expired (YES side), the flow advances to step S207. In contrast, when the photographing deadline has expired (NO side), the camera control unit 48 deletes face recognizing data whose photographing deadline has expired from the memory 43 (S206). Thereafter, the flow returns to step S204. At step S204, the camera control unit 48 repeatedly judges the other face recognizing data.

The camera control unit 48 is in standby state until the release button 47 is pressed halfway (S207). In this state, the image sensor 35 of the electronic camera 30 reads an image signal at intervals of a constant time period. In the first embodiment, a finder moving picture is generated and a face of a subject is recognized based on the image signal. When the release button 47 is pressed halfway, the image processing unit 42 executes a known face recognizing process based on the image signal (S208). The image processing unit 42 performs the face recognizing process for example by (1) detecting a face area from the input image, (b) cutting the face area therefrom, normalizing it, and detecting feature portions of eyebrows, eyes, nose, and mouth from the face area, and (c) collating the extracted feature portions with the face recognizing data and obtaining a correlation ratio thereof.

Thereafter, when the release button 47 is fully pressed, the camera control unit 48 photographs the subject. The image processing unit 42 generates image data (S209). The camera control unit 48 judges whether or not the person to be photographed has been photographed based on the result of the face recognizing process performed at step S208 (S210). When the person to be photographed has been photographed (YES side), the camera control unit 48 adds marker information that denotes that the person to be photographed has been photographed to a tag of the image data (S211). In contrast, when the person to be photographed has not been photographed (NO side), without adding marker information to a tag of the image data, the flow advances to step S212.

The camera control unit 48 judges whether or not photography is continued (S212). When photography is continued (YES side), the flow returns to step S207. In contrast, when photography is completed (NO side), the camera control unit 48 transmits the image data having the marker information to the photographing ordering device 10 (S213). In this case, image data and information representing the person to be photographed (for example, face recognizing data used to identify the person to be photographed) are correlatively transmitted to the photographing ordering device 10.

The camera control unit 48 may transmit image data photographed in a predetermined time period before and after the image data having marker information are photographed to the photographing ordering device 10. In other words, in image data in a predetermined time period after a person to be photographed is photographed, the person to be photographed may be photographed in the state that his or her face is not recognized (for example, he or she is photographed sideways). Thereafter, the operation of the electronic camera is completed.

FIG. 7 is a flow chart showing an operation of the photographing ordering device according to the first embodiment upon receiving image data.

The photographing ordering device 10 is in standby state until it receives image data (S301). When the photographing ordering device 10 receives image data from the electronic camera 30, the control unit 14 stores them to the recording unit 11 (S302). Thereafter, the control unit 14 searches for order content data based on an IP address of the electronic camera 30, information that represents a person to be photographed, and so forth recorded in a transmission header of the image data and obtains an IP address of an information terminal 20 that has ordered the image data (S303).

Thereafter, the control unit 14 judges whether or not the IP address of the information terminal 20 has been obtained (S304). When the IP address of the information terminal 20 has been obtained (YES side), the control unit 14 transmits the image data to the corresponding information terminal 20 (S305). Thereafter, the control unit 14 updates data that represents the current state of the order content data of the recording unit 11 to "image data already obtained" (S306). In contrast, when the IP address of the information terminal 20 has not been obtained (NO side), the control unit 14 completes the process. Thereafter, the operation of the photographing ordering device upon receiving image data is completed.

In the electronic camera system of the first embodiment, when the electronic camera 30 photographs a subject, the electronic camera 30 identifies it based on face recognizing data transmitted from the photographing ordering device 10 and transmits image data of a person to be photographed to the photographing ordering device 10. Thus, since the electronic camera 30 identifies a person to be photographed, even if a photographer at site cannot identify the person to be photographed, image data of the person to be photographed can be obtained. In addition, since the electronic camera 30 automatically judges image data of the person to be photographed and transmits the image data to the photographing ordering device 10, the burden of the work for which the photographer needs to select ordered image data from much image data is remarkably alleviated.

Description of Second Embodiment

Figure 8:
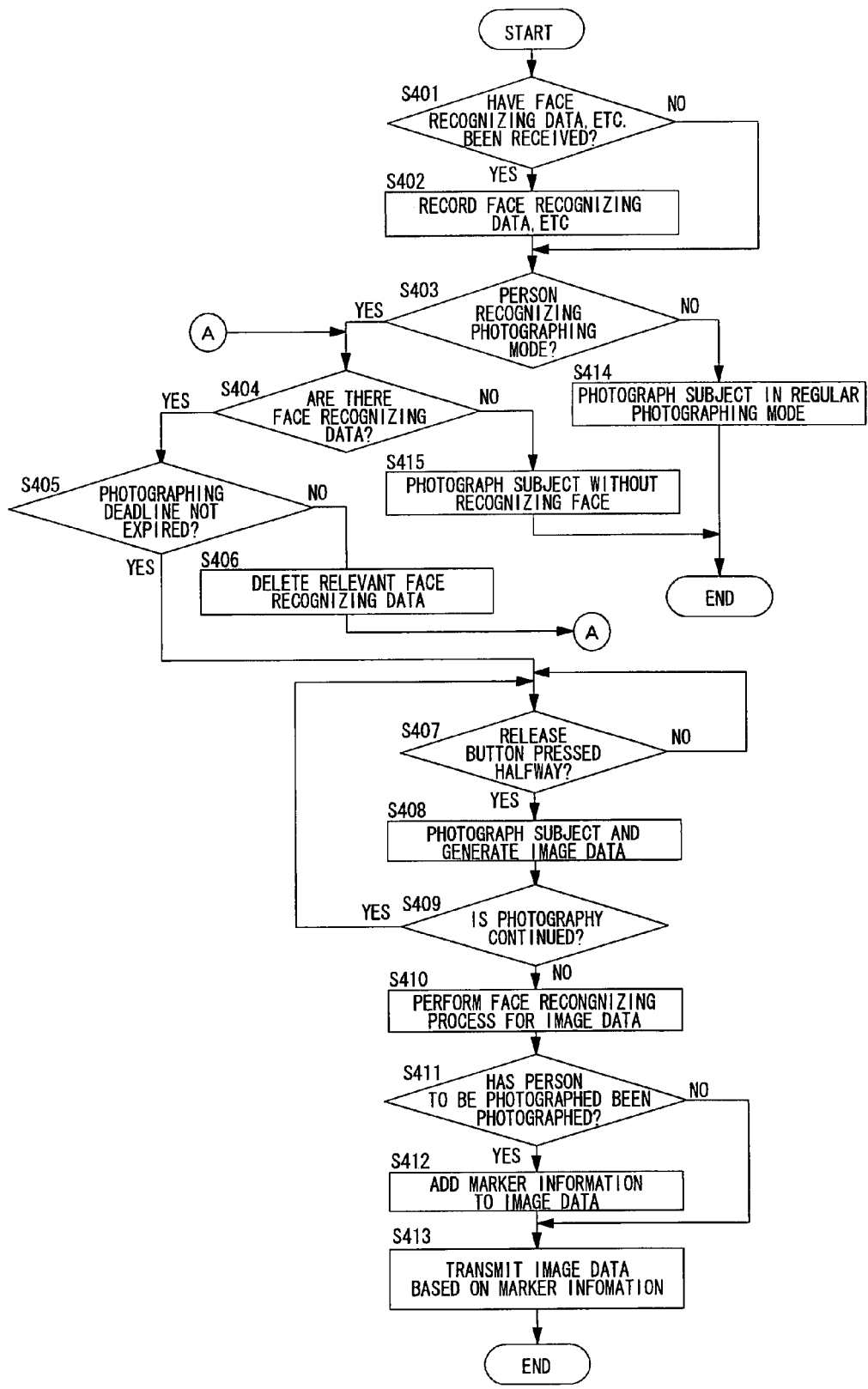
FIG. 8 is a flow chart showing an operation of an electronic camera according to a second embodiment.

FIG. 8 is a flow chart showing an operation of an electronic camera of an electronic camera system according to a second embodiment. The second embodiment is a modification of the first embodiment. In the second embodiment, after an electronic camera 30 completes photography, the electronic camera 30 executes a face recognizing process for image data.

In the following embodiments, common structures to those of the first embodiment will be represented by the identical reference numerals and their description will be omitted. In addition, since steps S401 to S406, S414, and S415 shown in FIG. 8 in the second embodiment correspond to steps S201 to S206, S214, and S215 shown in FIG. 6, their description will be omitted.

A camera control unit 48 is in standby state until a release button 47 is pressed halfway (S407). When the release button 47 is fully pressed, the camera control unit 48 photographs a subject. An image processing unit 42 generates image data (S408). Thereafter, the camera control unit 48 judges whether or not photography is continued (S409). When photography is continued (YES side), the flow returns to step S407. In contrast, when photography is completed (NO side), the flow advances to step S410.

The image processing unit 42 successively reads photographed image data and performs a known face recognizing process (S410). Thereafter, the camera control unit 48 judges whether or not a person to be photographed has been photographed in the image data based on the result of the face recognizing process at step S410 (S411). When the person to be photographed has been photographed (YES side), the camera control unit 48 adds marker information that denotes that the person to be photographed has been photographed to a tag of the image data (S412). In contrast, when the subject is not the person to be photographed (NO side), the flow advances to step S413 without adding marker information to a tag of the image data.

Thereafter, the camera control unit 48 transmits the image data having the marker information to a photographing ordering device 10 (S413). The camera control unit 48 may transmit image data that have photographed in a predetermined time period before and after the image data having the marker information have been photographed to the photographing ordering device 10. Thereafter, the operation of the electronic camera 30 of the second embodiment is completed.

In the foregoing second embodiment, the same effect as the first embodiment can be contained. In the second embodiment, when photography is performed, the face recognizing process is not performed. Thus, the second embodiment can be also applied to a single-lens reflex camera that a photographer observes a subject with an optical finder when he or she photographs the subject.

Description of Third Embodiment

Figure 9:
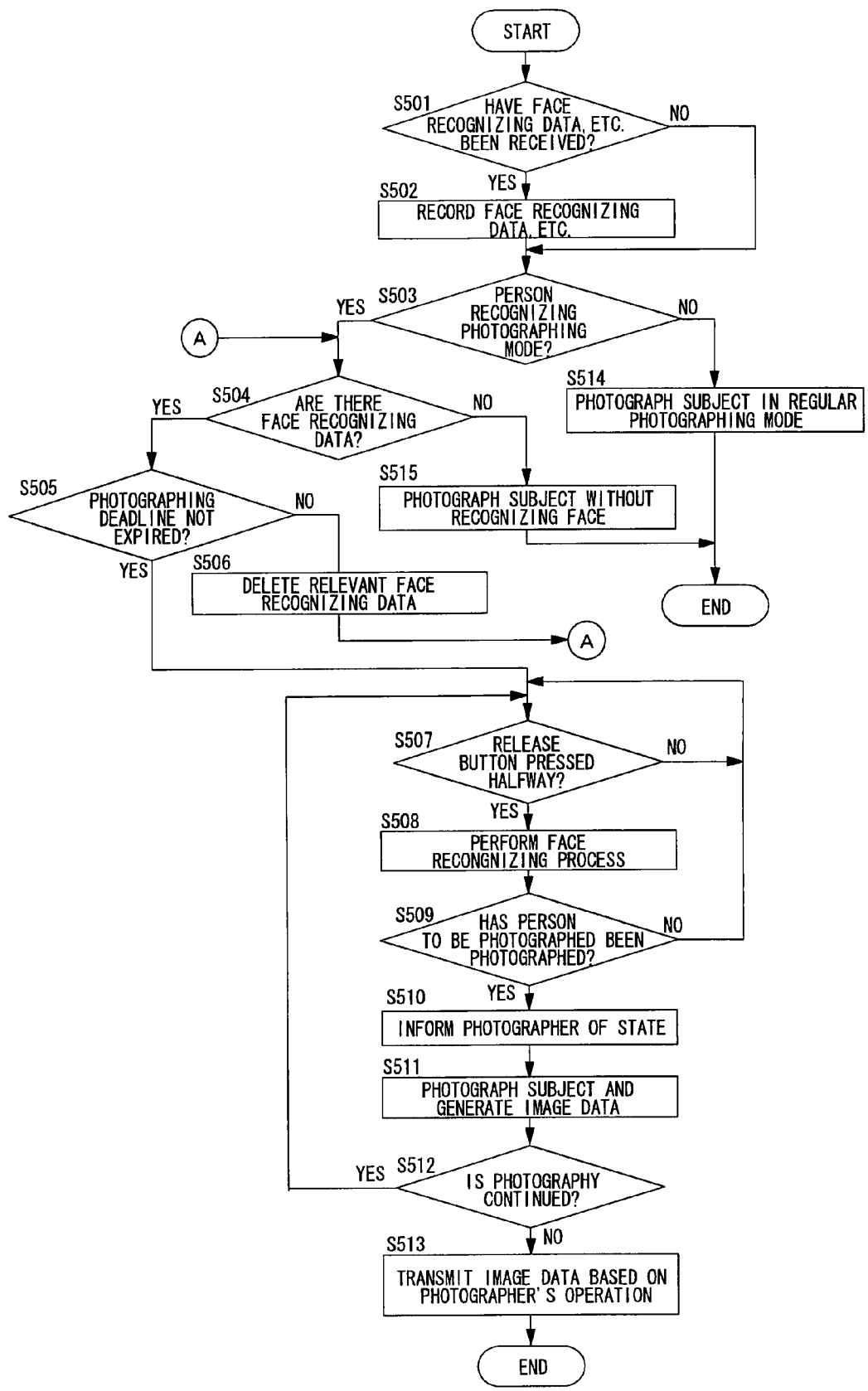
FIG. 9 is a flow chart showing an operation of an electronic camera according to a third embodiment.

FIG. 9 is a flow chart showing an operation of an electronic camera of an electronic camera system according to a third embodiment. In the third embodiment, when an electronic camera 30 photographs a subject, the electronic camera 30 identifies a subject. When the subject is a person to be photographed, the electronic camera 30 informs the photographer that the subject is the person to be photographed. In the third embodiment, since steps S501 to S506, S514, and S515 shown in FIG. 9 correspond to steps S201 to S206, S214, and S215 shown in FIG. 6, their description will be omitted.

A camera control unit 48 is in standby state until a release button 47 is pressed halfway (S507). In this state, an image sensor 35 of the electronic camera 30 reads an image signal at intervals of a constant time period. In the third embodiment, a finder moving picture is generated and a face of a subject is recognized based on the image signal. When the release button 47 is pressed halfway, an image processing unit 42 executes a known face recognizing process based on the image signal (S508).

Thereafter, the camera control unit 48 judges whether or not the subject is the person to be photographed based on the result of the face recognizing process at step S508 (S509). When the subject is the person to be photographed (YES side), the camera control unit 48 informs the photographer that the subject is the person to be photographed (S501). The informing method is not limited as long as it can call the photographer's attention to that. For example, a finder moving picture on a LCD 40 may indicate the position of the person to be photographed as a frame. Instead, a finder moving picture on the LCD 40 may indicate a warning. Instead, an alarm sound may occur. In addition, when the photographer is informed of that, a finder moving picture may indicate a face image of the person to be photographed. In contrast, when the subject is not the person to be photographed (NO side), the photographer is not informed, but the flow returns to step S507.

When the release button 47 is fully pressed, the camera control unit 48 photographs the person to be photographed. An image processing unit 42 generates image data (S511). Thereafter, the camera control unit 48 judges whether or not photography is continued (S512). When photography is continued (YES side), the flow returns to step S507. In contrast, when photography is completed (NO side), the camera control unit 48 transmits the image data to a photographing ordering device 10 based on a photographer's operation (S513). Thereafter, the operation of the electronic camera of the third embodiment is completed.

In the third embodiment, when the person to be photographed is on the photographing screen, the electronic camera 30 informs the photographer of this state. Thus, the photographer can independently follow and photograph the person to be photographed at site. Thus, the possibility of which a photographed image having a high degree of perfection is obtained is increased.

Description of Fourth Embodiment

FIG. 10 is a schematic diagram showing an electronic camera system according to a fourth embodiment. The electronic camera system of the fourth embodiment is composed of a master electronic camera 100 that a photographer directly operates and a slave electronic camera 200 that the master electronic camera 100 remotely operates. It is preferred that the master electronic camera 100 and the slave electronic camera 200 be single-lens reflex cameras, but not limited thereto.

Figure 11:
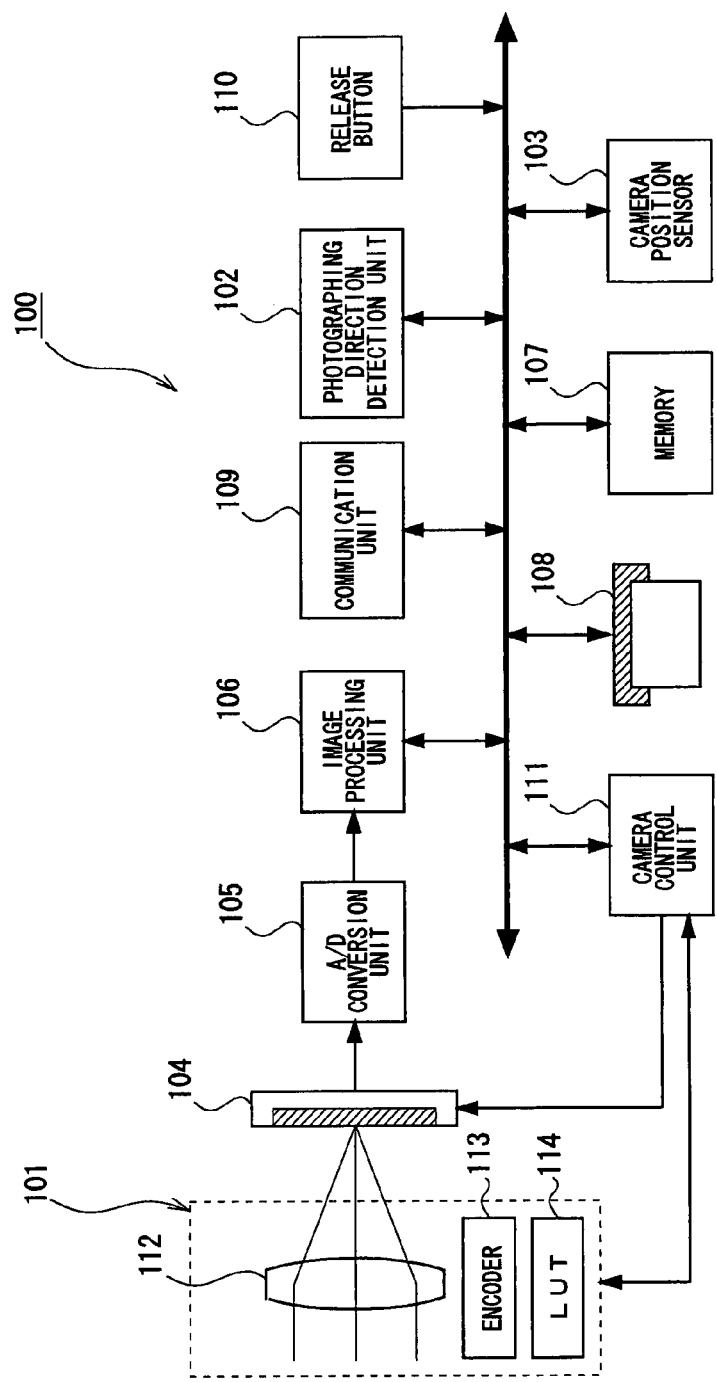
FIG. 11 is a block diagram showing a master electronic camera.

FIG. 11 is a block diagram showing a structure of the master electronic camera 100. The master electronic camera 100 has an interchangeable photographing lens unit 101, a photographing direction detection unit 102, a camera position sensor 103, an image sensor 104, an A/D conversion unit 105, an image processing unit 106, a memory 107, a record medium 108, a communication unit 109, a release button 110, and a camera control unit 111.

The photographing lens unit 101 has a photographing lens 112, an encoder 113 that detects the lens position of the photographing lens 112, and an LUT 114 that stores the relationship of the photographing distance, photographing angle of view, and the lens position. The photographing lens unit 101 is electrically connected to the camera control unit 111 through electric contacts (not shown). Thus, the camera control unit 111 can obtain data of the photographing distance and the photographing angle of view corresponding to the lens position from the photographing lens unit 101.

The photographing direction detection unit 102 obtains information of the photographing direction (orientation of the photographing lens) of the master electronic camera 100 and outputs the information of the photographing direction to the camera control unit 111. The photographing direction detection unit 102 is composed of for example an azimuth sensor or a gyro sensor that detects an azimuth with geomagnetism.

The camera position sensor 103 obtains information of the position (latitude and longitude) of the master electronic camera 100 and outputs the information of the camera position to the camera control unit 111. For the camera position sensor 103, a known positioning system for example a positioning system using GPS (Global Positioning System) or a positioning system using information generated from a plurality of base stations of a cellular type mobile communication system (PHS and so forth).

The image sensor 104 converts light of a subject that has passed through the photographing lens 112 into electricity and outputs an analog image signal corresponding to the electricity. The A/D conversion unit 105 converts the analog image signal into a digital image signal and outputs the digital image signal to the image processing unit 106. The image processing unit 106 performs an image process including for example gamma compensation, interpolation, and white balance adjustment, and generates image data. The image processing unit 106 also executes compression and decompression processes for the image data.

The memory 107 temporarily stores image data that are being processed in the image process. The record medium 108 is detachably attached to the master electronic camera 100. The record medium 108 stores image data for which the image process has been performed. The record medium 108 also pre-stores face recognizing data (for example, data representing positions of face parts such as eyebrows, eyes, nose, and mouth) of each person to be photographed.

The communication unit 109 controls data transmission and reception to and from the slave electronic camera 200. In this example, the master electronic camera 100 and the slave electronic camera 200 of the fourth embodiment may communicate data with each other through a known wireless communication system or a cable. Information transmitted from the master electronic camera 100 is face recognizing data of a person to be photographed, main photographing range information (which will be described later), and release information that represents release timing.

The camera control unit 111 executes various types of arithmetic operation processes such as AE arithmetic operation and AF arithmetic operation and controls the operation of each unit of the master electronic camera 100. In addition, the camera control unit 111 of the fourth embodiment generates the main photographing range information that represents the position of a subject (a person to be photographed) that the master electronic camera 100 photographs. The main photographing range information contains data of the position, photographing distance, photographing angle of view, and photographing direction of the master electronic camera 100.

Figure 12:
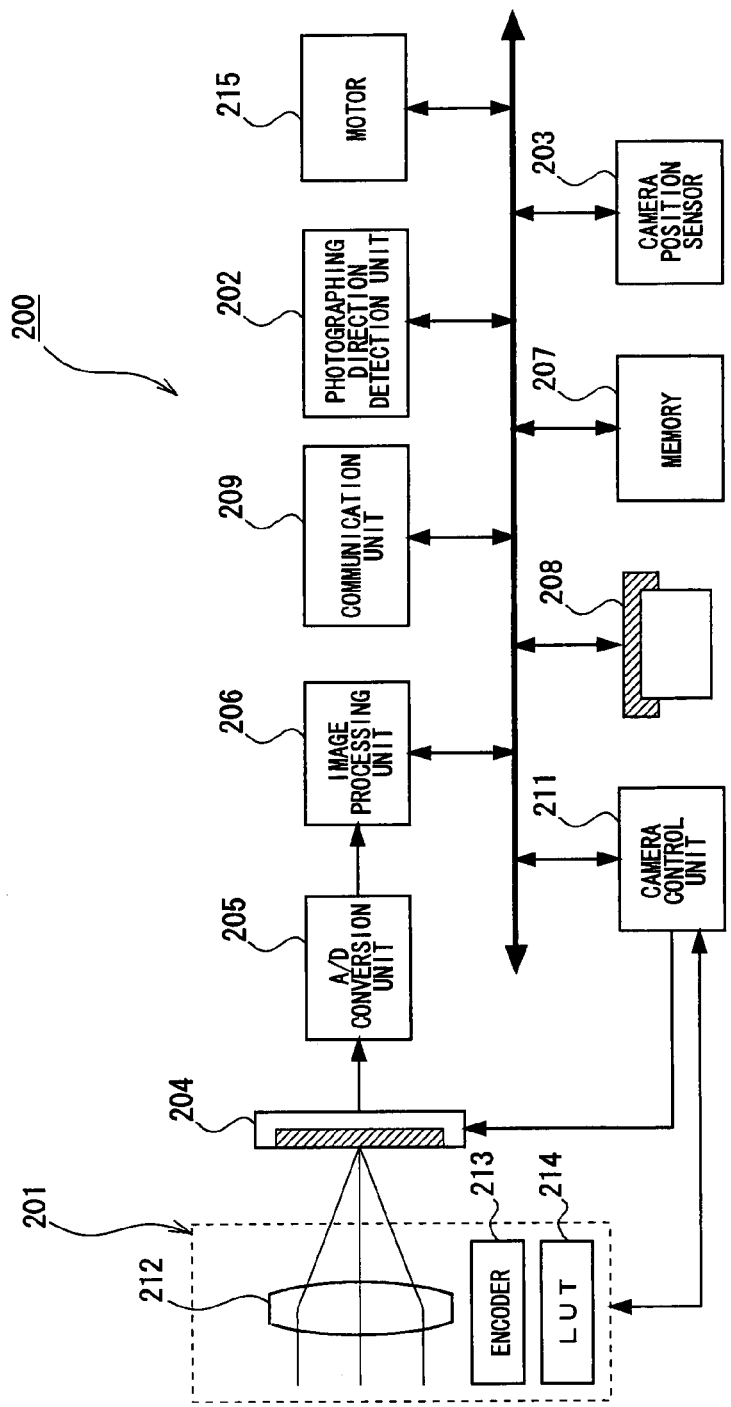
FIG. 12 is a block diagram showing a slave electronic camera.

FIG. 12 is a block diagram showing a structure of the slave electronic camera 200. The slave electronic camera 200 has an interchangeable photographing lens unit 201, a photographing direction detection unit 202, a camera position sensor 203, an image sensor 204, an A/D conversion unit 205, an image processing unit 206, a memory 207, a record medium 208, a communication unit 209, and a camera control unit 211. The slave electronic camera 200 is secured on a rotation table 216 that is rotatable in the pitching direction, yawing direction, and rolling direction. The rotation table 216 is rotated by a motor 215. In addition, the rotation table 216 is held at a predetermined height by a tripod 217. In the following description for the slave electronic camera 200, only different portions from the master electronic camera 100 will be described and the description of the redundant portions will be omitted.

When the slave electronic camera 200 photographs a subject, the image sensor 204 of the slave electronic camera 200 reads an image signal at intervals of a predetermined time period and outputs the image signal to the A/D conversion unit 205.

The image processing unit 206 performs a known face recognizing process based on the image signal read at intervals of a constant time period and judges whether or not there is a person to be photographed at any position on a photographing screen. Specifically, the image processing unit 206 performs the face recognizing process by (a) detecting a face region from the input image, (b) extracting the face region from the input image, normalizing it, detecting feature portions such as eyebrows, eyes, nose, and mouth from the face region, and (c) collating the extracted feature portions with face recognizing data and obtaining a correlation ratio thereof. The image processing unit 206 outputs the position of the person to be photographed on the photographing screen to the camera control unit 211.

The camera control unit 211 performs photography based on release information received from the master electronic camera 100. The camera control unit 211 is connected to the motor 215 of the rotation table 216. By driving the motor 215, the orientation of the camera can be adjusted in the pitching direction, yawing direction, and the rolling direction. In addition, in the camera control unit 211, a lens position of a photographing lens 212 can be freely adjusted by a drive mechanism (not shown).

The camera control unit 211 generates sub photographing range information that represents the position of the subject that the slave electronic camera 200 is being photographing. The sub photographing range information contains data of the position, photographing distance, photographing angle of view, and photographing direction of the slave electronic camera 200. The camera control unit 211 calculates a drive amount of the motor 215 and a drive amount of the photographing lens 212 based on the main photographing range information and the sub photographing range information so that the camera control unit 211 focuses the person to be photographed.

When the position of the face of the person to be photographed does not match a designation range on the photographing screen, the camera control unit 211 compensatively calculates the drive amount of the motor 215 and the drive amount of the photographing lens 212 so that the face of the person to be photographed matches the designation range. For example, when the face of the person to be photographed on the photographing screen deviates from the designation range upward, downward, leftward, or rightward, the camera control unit 211 rotates the motor 215 to adjust the orientation of the camera in the pitching direction or yawing direction. When the face of the person to be photographed protrudes from the designation range or the size of the face of the person to be photographed is smaller than a threshold value, the camera control unit 211 adjusts the drive amount of the photographing lens 212 based on the ratio of the face region of the person to be photographed to the designation range. At this point, by rotating the camera in the rolling direction, the camera control unit 211 can switch the photography mode between a portrait photography mode and a landscape photograph mode and incline the photographing screen. The photographer can freely pre-set the slave electronic camera 200 for the designation range on the photographing screen.

Figure 13:
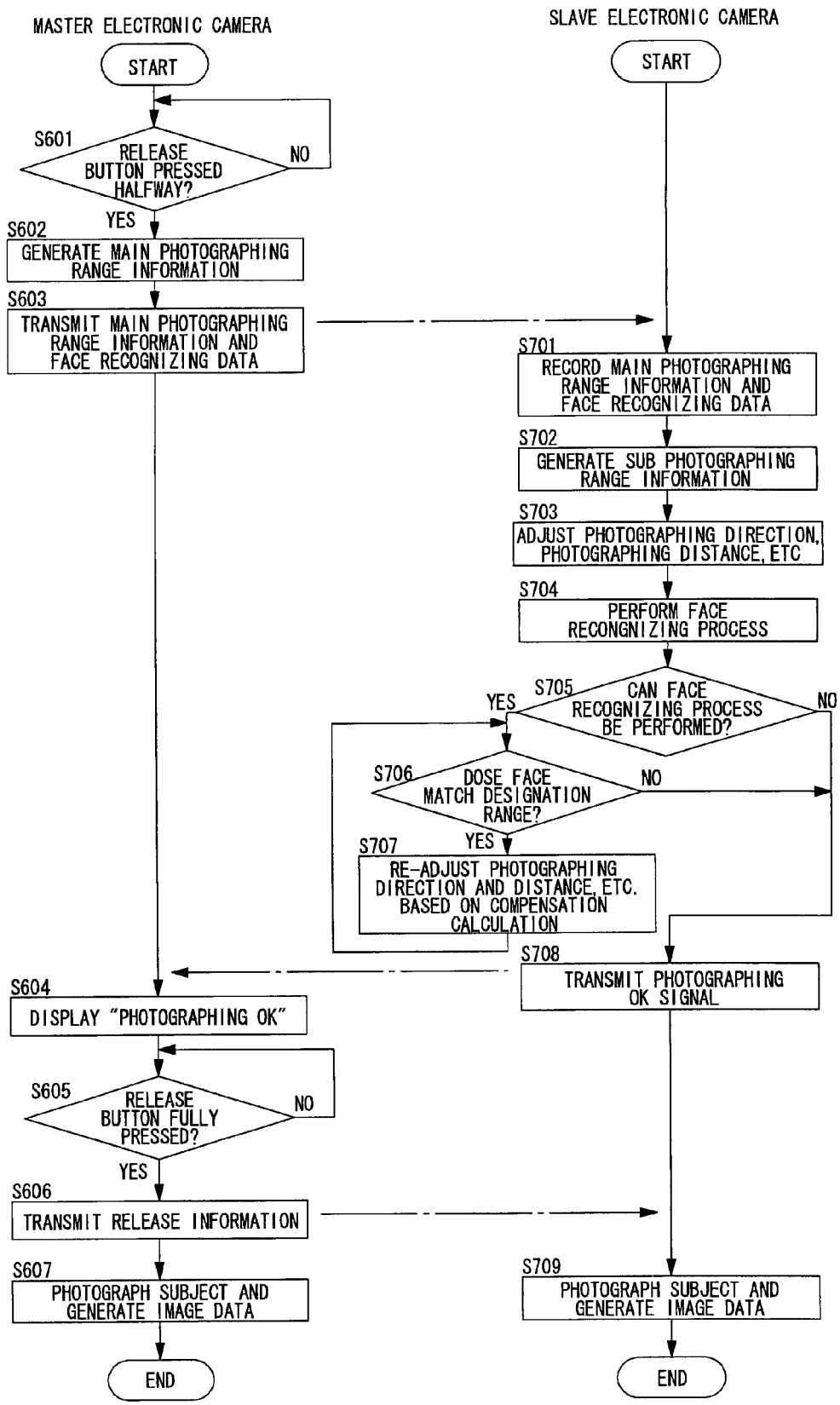
FIG. 13 is a flow chart showing a photographing operation of the electronic camera system according to the fourth embodiment.

The electronic camera system of the fourth embodiment is structured as described above. Next, a photographing operation of the electronic camera system will be described with reference to a flow chart shown in FIG. 13.

First, with the master electronic camera 100, the photographer frames a person to be photographed. The camera control unit 111 of the master electronic camera 100 is in standby state until the photographer presses the release button 110 halfway (S601). When the release button 110 is pressed halfway, the camera control unit 111 performs an in-focus control and so forth. In addition, the camera control unit 111 generates main photographing range information with outputs of the photographing direction detection unit 102 and the camera position sensor 103 (S602). The camera control unit 111 transmits the main photographing range information and face recognizing data to the slave electronic camera 200 (S603).

On the other hand, the camera control unit 211 of the slave electronic camera 200 records the received main photographing range information and face recognizing data to the memory 207 (S701). Thereafter, the camera control unit 211 generates sub photographing range information (S702). The camera control unit 211 calculates the drive amount of the motor 215 and the drive amount of the photographing lens 212 based on the main photographing range information and the sub photographing range information so that the slave electronic camera focuses the person to be photographed. The camera control unit 211 drives the motor 215 and the photographing lens 212 based on the calculated results and adjusts the photographing direction, photographing distance, and so forth of the slave electronic camera 200 (S703). In this state, the person to be photographed is on the photographing screen of the slave electronic camera 200 and the slave electronic camera 200 can photograph the person to be photographed.

Thereafter, the image processing unit 206 executes the face recognizing process based on the image signal that the image sensor 204 outputs at intervals of a constant time period and outputs the position of the person to be photographed on the photographing screen to the camera control unit 211 (S704). The camera control unit 211 judges whether or not the image processing unit 206 has performed the face recognizing process for the person to be photographed (S705). When the image processing unit 206 has performed the face recognizing process (YES side), the flow advances to step S706. In contrast, when the image processing unit 206 has not performed the face recognizing process (NO side), the flow advances to step S708.

Thereafter, the camera control unit 211 judges whether the face of the person to be photographed does not match the designation range on the photographing screen (S706). When the face does not match the designation range on the photographing screen (YES side), the camera control unit 211 compensatively calculates the drive amount of the motor 215 and the drive amount of the photographing lens 212 so that the face of the person to be photographed matches the designation range. Thereafter, the camera control unit 211 drives the motor 215 or the photographing lens 212 based on the calculated results and re-adjusts the photographing direction, photographing distance, and so forth of the slave electronic camera 200 (S707). Thereafter, the flow returns to step S706. At step S706, the camera control unit 211 repeats the foregoing operation (S706 to S707) until the face of the person to be photographed matches the designation range on the photographing screen. In contrast, when the face matches the designation range on the photographing screen (NO side), the flow advances to step S708.

Thereafter, the camera control unit 211 of the slave electronic camera 200 transmits a photographing OK signal that represents the completion of the photographing standby state to the master electronic camera 100 (S708). When the master electronic camera 100 has received the photographing OK signal, the camera control unit 111 displays a message that denotes that the master electronic camera 100 is in photographing OK state on a display unit (not shown) (S604). Thereafter, the camera control unit 111 is in standby state until the photographer fully presses the release button 110 (S605). When the release button 110 is fully pressed, the camera control unit 111 transmits release information to the slave electronic camera 200 (S606). Thus, the master electronic camera 100 and the slave electronic camera 200 synchronously and individually photograph the person to be photographed and generate image data of the person to be photographed (S607 and S709). Thereafter, the photographing operation of the electronic camera system of the fourth embodiment is completed.

According to the fourth embodiment, one photographer can photograph a person to be photographed from multiple directions with the master electronic camera 100 and the slave electronic camera 200. When the face of the person to be photographed does not match the designation range on the photographing screen, the slave electronic camera 200 automatically compensates its mechanism so that the face of the person to be photographed matches the designation range.

Thus, the possibility of which the photographer photographs the person to be photographed with his or her intension is more increased than the related art.

Supplemental Description of Embodiments

Although the present invention has been described with the foregoing embodiments, the scope of the present invention is not limited to such embodiments.

(1) In the first to third embodiments, the photographing ordering device may have an input unit so that the editor can directly order image data on the photographing ordering device without need to use the information terminal. In addition, the recording unit of the information terminal may store face recognizing data. The "photographing ordering system" of the present invention includes the foregoing structures besides the structures of the first to third embodiments.

(2) Although the electronic camera in each of the first to third embodiments has the communication unit, the "photographing system" according to the present invention is not limited to the electronic cameras having the foregoing structures. Without having the communication function to the photographing ordering device, the electronic camera may be connected to a communication adaptor, a note type personal computer having a communication function, a mobile phone, or the like so that the electronic camera can transmit and receive data to and from the photographing ordering device. The "photographing system" according to the present invention includes the case that the "photographing system" is composed of a camera system of which a communication unit is connected to an electronic camera as well as the case that the "photographing system" is composed of an electronic camera alone.

(3) In the first embodiment, each electronic camera may have a GPS unit. The photographing ordering device may periodically record position information of each camera. Thus, a camera that is ordered to perform photography may be selected based on the current position of each electronic camera.

(4) In the first embodiment, marker information is added to image data for which a person to be photographed has been photographed. After photography is performed, the image data are transmitted. Instead, whenever image data for a person to be photographed is generated, the image data may be transmitted.

(5) In the foregoing embodiments, person identifying data are not limited to face recognizing data. For example, a face image of a person to be photographed may be transmitted and a camera that executes the face recognition may generate face recognizing data based on the face image. Instead, a person to be photographed may be judged based on a combination of a uniform player number and a uniform color instead of face recognition.

(6) In the fourth embodiment, the slave electronic camera may pre-store face recognizing data without need to transmit face recognizing data from the master electronic camera.

The invention is not limited to the above embodiments and various modifications may be made without departing from the spirit and scope of the invention. Any improvement may be made in part or all of the components.

The invention claimed is:

1. An electronic camera system comprising a master electronic camera and a slave electronic camera, wherein said master electronic camera includes a first photographing mechanism which photographs a subject; an operation member which executes a release of said photographing mechanism; a first photographing range information generation unit which generates main photographing range information which represents a position of a person to be photographed of said first photographing mechanism based on position information, a photographing distance, a photographing angle of view, and a photographing direction of said master electronic camera; a recording unit which stores person identifying data used to recognize a face of said person to be photographed; and a first communication unit which transmits said main photographing range information, said person identifying data, and release information to said slave electronic camera, and wherein said slave electronic camera includes a second photographing mechanism which photographs the subject; a second photographing range information generation unit which generates sub photographing range information based on the position information, the photographing distance, the photographing angle of view, and the photographing direction of said slave electronic camera; a drive mechanism which rotates said second photographing mechanism and varies the photographing direction thereof; a second communication unit which receives information from said first communication unit; a subject judging unit which judges whether or not said person to be photographed is at any position on a photographing screen of said second photographing mechanism based on said person identifying data; an arithmetic operation unit which performs an arithmetic operation for control information with which said person to be photographed is photographed based on said main photographing range information and said sub photographing range information; a compensation arithmetic operation unit which compensates said control information and frames said person to be photographed in a designation range when said person to be photographed is on said photographing screen and said person to be photographed does not match said designation range on said photographing range; and a control unit which controls said second photographing mechanism and said drive mechanism based on said control information and causes said second photographing mechanism to perform photography based on said release information.

* * * * *